US009425606B2

(12) United States Patent
Yamaguchi et al.

(10) Patent No.: US 9,425,606 B2
(45) Date of Patent: Aug. 23, 2016

(54) ELECTRIC DISTRIBUTION NETWORK WITH AD HOC COMMUNICATION FUNCTION

(71) Applicant: KABUSHIKI KAISHA TOSHIBA, Minato-ku (JP)

(72) Inventors: Yoshihiro Yamaguchi, Inagi (JP); Ryo Yano, Tachikawa (JP); Keiko Mori, Kunitachi (JP); Mitsukage Yamada, Fuchu (JP); Michiyo Ogino, Kawasaki (JP); Yoshihiro Ogita, Fuchu (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 586 days.

(21) Appl. No.: 13/797,029

(22) Filed: Mar. 12, 2013

(65) Prior Publication Data
US 2013/0204452 A1 Aug. 8, 2013

Related U.S. Application Data

(63) Continuation of application No. PCT/JP2010/006868, filed on Nov. 25, 2010.

(30) Foreign Application Priority Data

Sep. 15, 2010 (JP) .................................. 2010-206704

(51) Int. Cl.
*H02H 3/02* (2006.01)
*H04B 3/54* (2006.01)

(52) U.S. Cl.
CPC . *H02H 3/02* (2013.01); *H04B 3/54* (2013.01); *H04B 2203/5408* (2013.01); *H04B 2203/5445* (2013.01)

(58) Field of Classification Search
None
See application file for complete search history.

(56) References Cited

U.S. PATENT DOCUMENTS

2004/0193329 A1 9/2004 Ransom et al.
2005/0144437 A1* 6/2005 Ransom .................... G06F 1/28
713/151

(Continued)

FOREIGN PATENT DOCUMENTS

JP 01-274535 11/1989
JP 6-197450 A 7/1994

(Continued)

OTHER PUBLICATIONS

Office Action issued Dec. 3, 2013 in Japanese Patent Application No. 2010-206704.

(Continued)

*Primary Examiner* — Mohammad Ali
*Assistant Examiner* — Bernard G Lindsay
(74) *Attorney, Agent, or Firm* — Oblon, McClelland, Maier & Neustadt, L.L.P.

(57) ABSTRACT

An information communication device is provided with a monitoring unit, a communication unit, a storage unit, a switching unit, an acquisition unit, a creation unit, and a transmission unit. In the event that the monitoring unit detects trouble in the basic network, the switching unit switches the communication function of the communication unit from a first communication function to a second communication function. In the event that the monitoring unit detects trouble in the basic network, the creation unit creates notification information about the trouble in the basic network. The transmission unit transmits the created notification information via the switched-to communication function to a contact retrieved from the storage unit.

7 Claims, 10 Drawing Sheets

(56) References Cited

U.S. PATENT DOCUMENTS

| | | |
|---|---|---|
| 2005/0278047 A1 | 12/2005 | Ahmed |
| 2006/0109787 A1 | 5/2006 | Strutt et al. |
| 2006/0180371 A1 | 8/2006 | Breed et al. |
| 2006/0188128 A1 | 8/2006 | Rhoads |
| 2007/0025039 A1* | 2/2007 | Sousa ............ H02J 1/14 361/90 |
| 2008/0039979 A1 | 2/2008 | Bridges et al. |
| 2009/0088907 A1 | 4/2009 | Lewis et al. |
| 2011/0140911 A1* | 6/2011 | Pant ............ H04B 3/546 340/870.02 |
| 2011/0288905 A1* | 11/2011 | Mrakas ............ G06Q 10/06 705/7.25 |

FOREIGN PATENT DOCUMENTS

| | | |
|---|---|---|
| JP | 2000-307526 | 11/2000 |
| JP | 2004-128785 A | 4/2004 |
| JP | 2004-254254 A | 9/2004 |
| JP | 2005-057814 | 3/2005 |
| JP | 2005-333378 A | 12/2005 |
| JP | 2007-165999 A | 6/2007 |
| JP | 2010-512727 A | 4/2010 |
| WO | 2008/073453 A1 | 6/2008 |

OTHER PUBLICATIONS

International Preliminary Report on Patentability issued Apr. 18, 2013 in PCT/JP2010/006868 filed Nov. 25, 2010.

Written Opinion issued Feb. 15, 2011 in PCT/JP2010/006868 filed Nov. 25, 2010.

International Search Report mailed Feb. 15, 2011 in PCT/JP2010/006868 filed Nov. 25, 2010.

International Written Opinion mailed Feb. 15, 2011 in PCT/JP2010/006868 filed Nov. 25, 2010.

Office Action issued Jul. 29, 2014 in Japanese Patent Application No. 2010-206704.

\* cited by examiner

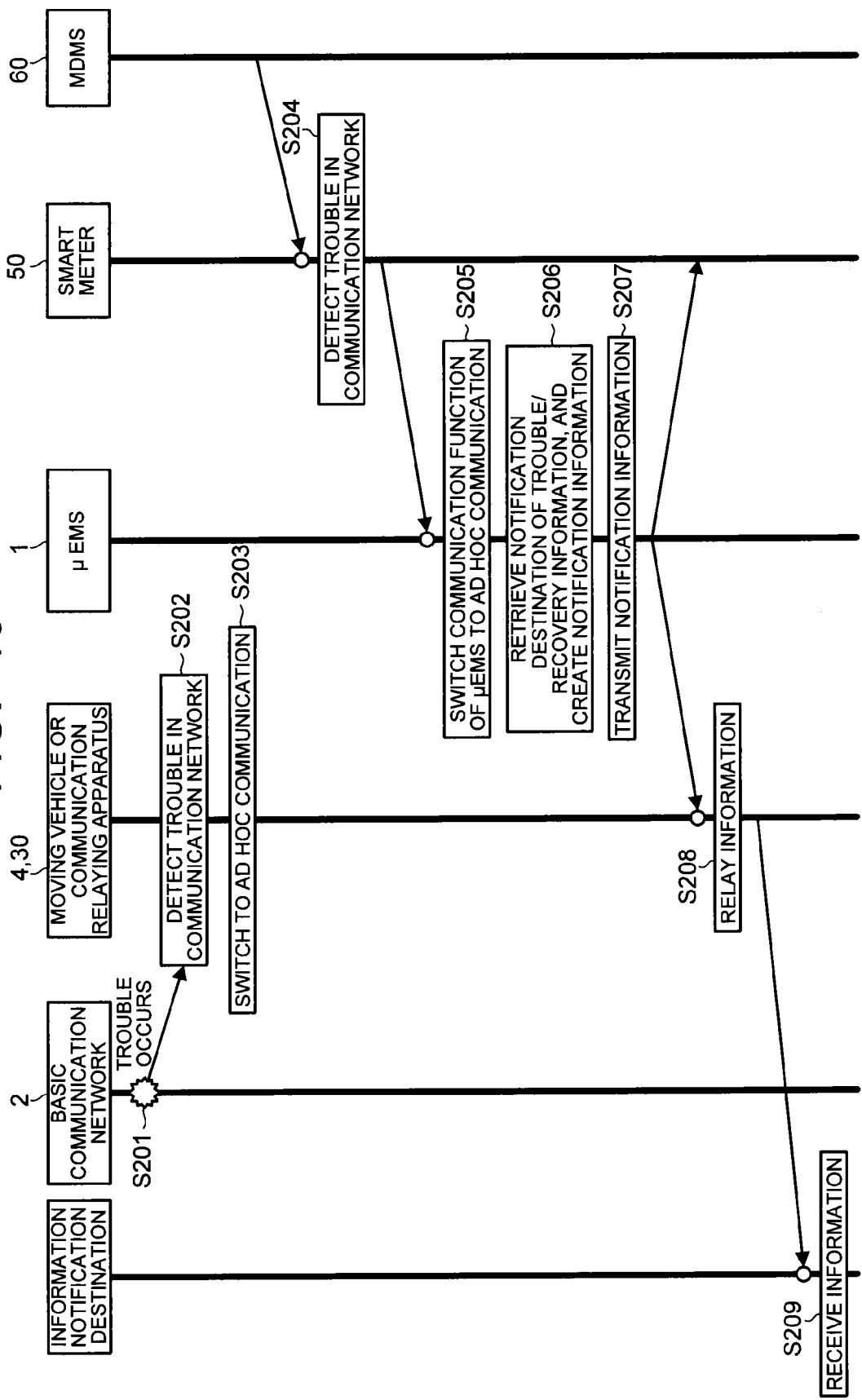

ELECTRIC DISTRIBUTION NETWORK WITH AD HOC COMMUNICATION FUNCTION

CROSS-REFERENCE TO RELATED APPLICATIONS

This application is a continuation of prior International Application No. PCT/JP2010/006868 filed on Nov. 25, 2010, which is based upon and claims the benefit of priority from Japanese Patent Application No. 2010-206704 filed on Sep. 15, 2010; the entire contents of all of which are incorporated herein by reference.

FIELD

Embodiments described herein relate generally to an information communication device and an information communication method, which are applied to a next-generation power network such as a smart grid, for example.

BACKGROUND

Use of smart grid for a power network is growing rapidly to strengthen an electricity infrastructure, as a countermeasure to efficient energy use, reduction of carbon dioxide, and the like.

A smart grid is a next-generation power network, which is configured to execute bidirectional communication between the consumer side that uses electricity and the supplier side that supplies electricity via a communication network, and which is capable of monitoring an electricity use status and trouble information by the consumer side and the supplier side in real time, by incorporating ICT (Information and Communication Technology) in a power network.

Recently, there is developed a technology in which, in addition to large-scale power sources (nuclear power generation, hydro power generation, thermal power generation, etc.), distributed power sources (solar power generation, wind power generation, fuel cell, secondary battery, biomass power generation, etc.) as renewable energy are included in an electric system, and in which ICT manages and distributes them intelligently, and grasps an electricity supply-demand status and a system trouble status in real time, to thereby realize an efficient electricity operation.

Further, although there are proposed many communication methods of connecting the consumer side and the supplier side in a smart grid, a common communication standard is not set, and there are various communication standards, at present.

Meanwhile, it is needless to say that a communication infrastructure is important, and a communication infrastructure is extremely important when a disaster such as an earthquake, typhoon, fire, flood, or the like occurs.

When a disaster occurs, it is necessary to grasp disaster information as soon as possible, and to accurately share the information by residents and rescue teams, to thereby rapidly execute aid and recovery.

Specifically, because a heavy damage, which affects electricity and communication infrastructures that relate closely to our lives, may be a serious problem for peoples' lives and socioeconomic activities, immediate attention is demanded.

When a disaster occurs, it is necessary to grasp and inform disaster information rapidly and accurately at the early stage, i.e., within half a day or a day immediately after the occurrence of a disaster.

If it is not possible to grasp disaster information accurately, an electric vehicle, which can be a power source, cannot be mobilized to a power outage area, and an emergency vehicle such as an ambulance cannot be mobilized to aid victims, which may hinder rapid and efficient recovery and aid.

Further, even if a disaster information notification and disaster information sharing system employing ICT and the like are fully-equipped, they execute communication via an access point, which is a part of a basic communication path, most of the time, there is a limit to an alternate communication path in a case where a basic communication path is broken when a disaster occurs, and they thus have no meaning when a major disaster occurs.

After all, a rescue team goes to a site and confirms a disaster status, and people transmit information. That is, it cannot help but rely on people's action, which is a heavy drag on aid activities and recovery activities.

In view of this, in a case of disaster, it is necessary to secure an information transmitting/receiving means by supplying electricity to a communication device, which transmits/receives information.

BRIEF DESCRIPTION OF THE DRAWINGS

FIG. 10 is a flowchart showing an operational example of a second case when a trouble occurs in the basic power network.

DETAILED DESCRIPTION

Figure 1:
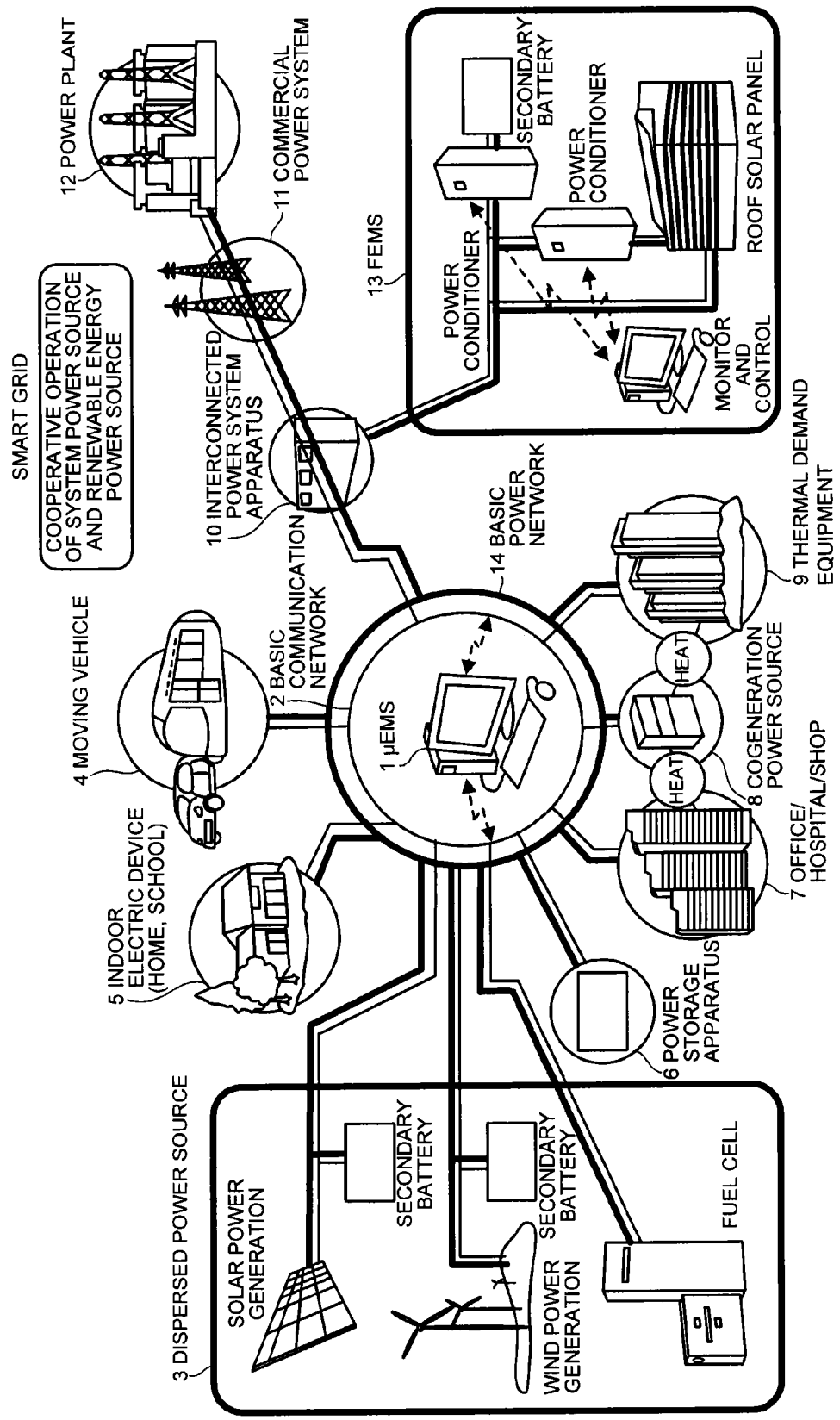
FIG. 1 is a diagram showing a schematic structure of a smart grid.

In an embodiment, it is described to solve the above-mentioned problems, and it is an object of the present invention to provide an information communication device and an information communication method capable of securing an alternate complementary communication network, a complementary in-house emergency power source, and the like, and smoothly realizing an evacuation notification, aid, recovery, and the like, if a power network or a communication network in a stricken area is isolated from other systems in a case of disaster.

According to an embodiment, there is provided an information communication device connected to a basic network, the basic network including an electric system network and a communication system network, the electric system network supplying electricity to an indoor electric device via a smart meter, the communication system network being established in parallel with the electric system network, the communication system network wired and/or wireless-communicating with the smart meter, characterized in that the information communication device includes: a communication unit having a first communication function and a second communication function, the first communication function being used for communication with another device via the basic network normally, the second communication function being used for communication with another device without using the basic network; a monitoring unit configured to detect that a failure occurs in the basic network or that the basic network is recovered from a failure; a communication function switching unit configured to switch, in a case where the monitoring unit detects that a failure occurs in the basic network, a communication function of the communication unit from the first communication function to the second communication function, and to switch, in a case where the monitoring unit detects that the basic network is recovered from a failure, a communication function of the communication unit from the second communication function to the first communication function; a storage, a contact being stored in the storage, the contact being used to inform that a failure occurs in the basic network or that the basic network is recovered from a failure; a creation unit configured to create, in a case where the monitoring unit detects that a failure occurs in the basic network, notification information that a failure occurs in the basic network, and to create, in a case where the monitoring unit detects that the basic network is recovered from a failure, notification information that the basic network is recovered from a failure; and a transmitting unit configured to transmit notification information to a contact by means of a switched communication function, the notification information being generated by the creation unit, the contact being retrieved from the storage.

According to an embodiment, there is provided an information communication method performed by an information communication device connected to a basic network, the basic network including an electric system network and a communication system network, the electric system network supplying electricity to an indoor electric device via a smart meter, the communication system network being established in parallel with the network, the communication system network wired and/or wireless-communicating with the smart meter, characterized in that the information communication method includes: detecting that a failure occurs in the basic network or that the basic network is recovered from a failure; switching, in a case where a failure occurred in the basic network is detected, the communication function from the first communication function to the second communication function, and switching, in a case where recovery of the basic network from a failure is detected, the communication function from the second communication function to the first communication function; creating, in a case where a failure occurred in the basic network is detected, notification information that a failure occurs in the basic network, and creating, in a case where recovery of the basic network from a failure is detected, notification information that the basic network is recovered from a failure; and transmitting the generated notification information to a preset contact by means of a switched communication function.

According to an embodiment, it is possible to secure an alternate complementary communication network, a complementary in-house emergency power source, and the like, and to smoothly realize an evacuation notification, aid, recovery, and the like, if a power network or a communication network in a stricken area is isolated from other systems in a case of disaster.

Figure 2:
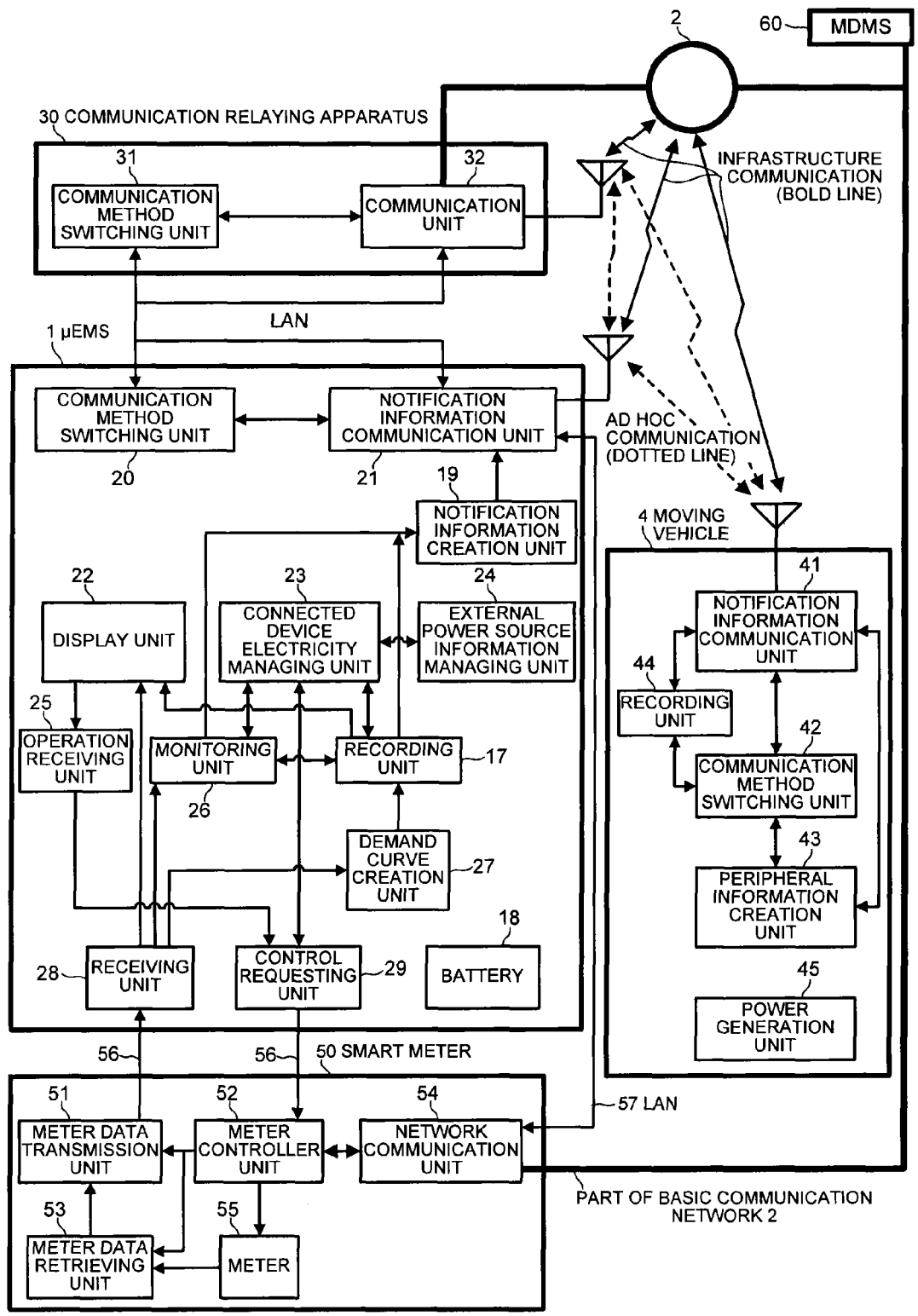
FIG. 2 is a diagram showing an example of the configuration of an information sharing system in a smart grid.

Hereinafter, an information sharing system of a smart grid according to an embodiment will be described in detail with reference to the drawings. FIG. 1 is a diagram showing a schematic structure of a smart grid, and FIG. 2 is a diagram showing an example of the configuration of an information sharing system of the smart grid.

As shown in FIG. 1, the smart grid is a next-generation power network, in which dispersed power sources 3, moving vehicles 4 including electric vehicles, emergency vehicles, and new transport systems such as light rails, indoor electric devices 5 at home and at school, a power storage apparatus 6, offices/hospitals/shops 7, a cogeneration power source 8, a thermal demand equipment 9, an interconnected power system apparatus 10, a commercial power system 11, a power plant 12, an FEMS (Factory Energy Management System) 13, a basic power network 14, and the like, and a monitor-and-control apparatus (Micro Energy Management System: μEMS) 1 are connected to each other via a bidirectional ICT (Information and Communication Technology) communication network (hereinafter referred to as "basic communication network 2"), and in which the μEMS 1 manages supply-demand balance of energy transmission and distribution while communicating with the respective apparatuses and devices.

The basic power network 14, which is a first basic network of the electric system, and the basic communication network 2, which is a second basic network of a communication system established in parallel with the basic power network 14, are collectively referred to as "basic network".

The basic communication network 2 includes both a wired communication network, which employs a wired communication system such as a LAN (local area network) for communicating with apparatuses other than moving vehicles such as the power plant 12, and a wireless communication network, which employs a wireless communication system such as a wireless LAN or a mobile communication means (mobile phone) for communicating with the moving vehicle 4.

The dispersed power sources 3 are electricity sources capable of supplying electricity to the indoor electric devices 5 via a system different from the basic power network 14.

That is, the smart grid is a next-generation power network, which incorporates ICT in a power network, which connects the electricity consumer side and the supplier side bidirectionally via the communication network, and which grasps electricity supply-demand status in more detail, to thereby realize electricity management, accident response, and the like efficiently. In the smart grid, the information sharing system is constructed around the μEMS 1, which is the center.

As shown in FIG. 2, in the information sharing system of this embodiment, the μEMS 1, a communication relaying apparatus 30, a smart meter 50, an MDMS (Meter Data Management System) 60, the moving vehicle 4, and the like are connected to each other via a wireless communication network (wireless LAN) or via a wired communication network (LAN, dedicated communication cable 56, or the like). The wireless LAN is, for example, in conformity with a standard such as IEEE 802.XX.

The μEMS 1, the communication relaying apparatus 30, the smart meter 50, the MDMS (Meter Data Management System) 60, the moving vehicle 4, and the like are information communication devices. The information communication devices are wired and/or wireless-connected to the basic power network 14, which supplies electricity to the indoor electric device 5 via the smart meter 50.

The communication relaying apparatus 30 has a function of relaying information on the μEMS 1 to another apparatus. The communication relaying apparatus 30 autonomously switches a communication function in a case where a failure occurs in the basic communication network 2, which is a basic network used normally, and has an ad hoc communication function (second communication function) of forming a local communication network (small-area communication network) to execute communication.

The communication relaying apparatus 30 includes a communication method switching unit 31 and a communication unit 32.

The communication unit 32 has a wired LAN communication function via a LAN cable and a wireless LAN communication function, and transmits/receives information by means of a communication function switched by the communication method switching unit 31.

That is, the communication unit 32 has the first communication function of communicating with another apparatus via the basic communication network 2 normally, and the second communication function of commonly communicating with another apparatus without using the basic communication network 2.

The first communication function includes a wired LAN communication function and a wireless LAN infrastructure communication mode. The second communication function is a wireless LAN ad hoc communication mode.

The communication method switching unit 31 switches a communication function of the communication relaying apparatus 30. The communication method switching unit 31 switches the communication function of the communication unit 32 to a communication method (one mode of infrastructure communication mode (first communication function) and ad hoc communication mode (second communication function)) depending on the infrastructure status informed (notified) by the μEMS 1, in a case of communicating with another apparatus (for example, moving vehicle 4, etc.) via a wireless LAN.

The infrastructure communication mode (first communication function) is a mode in which the communication relaying apparatus 30 or the basic communication network 2 itself functions as an access point and the access point communicates with another apparatus via the basic communication network 2. The communication via the basic communication network 2 is the infrastructure communication (first communication function). The ad hoc communication mode (second communication function) is a mode in which an apparatus directly communicates with another apparatus without using the basic communication network 2, and information is shared via each apparatus.

The smart meter 50 is installed at an electricity user side, i.e., consumer side.

The smart meter 50 has a function of measuring instantaneous values of electricity consumption, voltage, current, frequency, and the like in real time and storing them, and has a function of transmitting the obtained data to the μEMS 1, computers at a fee calculation center and an office under the jurisdiction, and the like wirelessly or via a communication cable such as an electric wire or an optical fiber network.

That is, the smart meter 50 is a next-generation electricity measuring device, which measures consumption of electricity, water, gas, and the like, and which supports the ICT enabling bidirectional communication between a consumer side and a supplier side.

The smart meter 50 includes a meter data transmission unit 51, a meter controller unit 52, a meter data retrieving unit 53, a network communication unit 54, and a meter 55.

The meter 55 measures the amount of in-house electricity, which is supplied from the basic power network 14 or which is generated in-house and sold.

The meter data retrieving unit 53 is controlled by the meter controller unit 52, retrieves meter data, which is measured by the meter 55, from the meter 55, and provides the meter data to the meter data transmission unit 51.

The meter data transmission unit 51 transmits the meter data, which is received from the meter data retrieving unit 53, to the μEMS 1 via the communication cable 56.

The network communication unit 54 transmits/receives information to/from a notification information communication unit 21 of the μEMS 1 via a LAN 57.

Further, the network communication unit 54 is connected to the MDMS 60 via the basic communication network 2.

The network communication unit 54 communicates with the MDMS 60 via the basic communication network 2, detects that a failure (trouble) occurs in the basic communication network 2 in a case of breakdown of communication with the MDMS 60, generates information (μEMS basic communication network communication presence/absence determination information 116) showing that a failure (trouble) occurs in the basic communication network 2, transmits the information to the notification information communication unit 21 of the μEMS 1 via the LAN 57, and notifies the notification information communication unit 21 of the μEMS 1 that a failure (trouble) occurs in the basic communication network 2.

The meter controller unit 52 controls a series of behaviors executed by the respective units, i.e., from measurement of meter data to transmission to the μEMS 1. The information including meter data, which is obtained from the smart meter 50 by the μEMS 1, is referred to as meter information.

The μEMS 1 is installed at the consumer side. The μEMS 1 is connected to the basic power network 14, which supplies electricity to the indoor electric device 5 via the smart meter 50, and to the basic communication network 2, which wired and/or wireless-communicates with the smart meter 50 and which is established in parallel with the basic power network 14.

The μEMS 1 manages micro electricity and manages a micro communication network based on data measured by the smart meter 50 and the like.

Further, the μEMS 1 is capable of displaying data measured by the smart meter 50 and inputting operations, and may be referred to as smart display or the like.

The MDMS 60 stores/manages data received from the smart meter 50 via the basic communication network 2. Further, the MDMS 60 transmits data and control instructions to the smart meter 50 via the basic communication network 2.

The μEMS 1 includes a battery 18, a notification information creation unit 19, a communication method switching unit 20, the notification information communication unit 21, a display unit 22, a connected device electricity managing unit 23, an external power source information managing unit 24, an operation receiving unit 25, a monitoring unit 26, a storage unit 17, a receiving unit 28, and a control requesting unit 29.

The receiving unit 28 functions as a meter information acquisition unit configured to obtain, from the smart meter 50, meter information on presence/absence of electricity supply from the basic power network 14 to the smart meter 50.

The meter information includes meter data measured by the smart meter 50, a meter ID, and the like.

The receiving unit 28 receives meter information transmitted from the smart meter 50, and outputs the meter information to the monitoring unit 26, the display unit 22, and the like.

The control requesting unit 29 transmits a request command for controlling the smart meter 50 (function thereof) to the smart meter 50 via the communication cable 56.

In a case where the μEMS 1 is capable of communicating with a neighboring self-power-generating device (for example, the moving vehicle 4, etc.) by means of the ad hoc communication mode (second communication function) communication, the control requesting unit 29 generates a control instruction to supply electricity from the self-power-generating device (for example, the moving vehicle 4, etc.) to the smart meter 50 and the μEMS 1 itself.

Further, the control requesting unit 29 transmits, to the smart meter 50, a control instruction to supply electricity from an electricity source to the respective indoor electric devices 5 based on a supply-demand balance regulating procedure, which is generated by a supply-demand balance regulating procedure creation unit 202 (see FIG. 4) of the connected device electricity managing unit 23.

The display unit 22 displays meter data measured by the smart meter 50.

In addition, the display unit 22 displays a switched status of a communication function, notification information, and the like, when a trouble occurs.

The external power source information managing unit 24 obtains information from an external power source connected to the μEMS 1, and manages the power source by switching to the built-in battery 18 when electricity is not obtained from the external power source, and by switching to the external power source as a power supply path when the external power source is recovered.

The operation receiving unit 25 includes a button enabling key input, a GUI enabling information input by touching a screen, and the like, and receives an instruction for a function operation in case of trouble, which is input by an owner (operator) of the μEMS 1.

The monitoring unit 26 monitors meter information received from the smart meter 50, information stored in the storage 17, and the like, and supplies the information obtained by monitoring, to the notification information creation unit 19.

The monitoring unit 26 detects that a failure (trouble) occurs in the basic power network 14 or detects recovery from the failure based on meter data of meter information obtained from the receiving unit 28.

A demand curve creation unit 27 creates demand characteristics (demand curve) showing relation between meter data, which is included in meter information obtained from the smart meter 50 as needed, and measurement time, and supplies the demand characteristics (demand curve) to the notification information creation unit 19 via the storage 17.

The storage 17 is a recording device such as a memory, a hard disk drive, an SSD, or the like.

The storage 17 stores information obtained from the respective apparatuses and information processed by the respective units.

Further, threshold data, which is used to determine trouble occurred in the respective apparatuses and the respective devices, are previously stored (registered) in the storage 17.

The notification information communication unit 21 has the first communication function of communicating with another apparatus via the basic communication network 2 normally, and the second communication function of communicating with another apparatus without using the basic communication network 2.

The first communication function includes a wired LAN communication function and a wireless LAN infrastructure communication mode. The second communication function is a wireless LAN ad hoc communication mode.

Further, the notification information communication unit 21 functions as a notification information transmission unit configured to transmit notification information, which is generated by the notification information creation unit 19, to a contact retrieved from the storage 17 by means of a switched communication function.

Further, the notification information communication unit 21 wirelessly transmits control instructions (control commands) from the communication method switching unit 20 to the communication relaying apparatus 30 and the moving vehicle 4.

In a case where the monitoring unit 26 detects a trouble in the basic communication network 2, the communication method switching unit 20 changes a communication function of the notification information communication unit 21 from the first communication function to the second communication function, and, in a case where the monitoring unit 26 detects recovery from the trouble, the communication method switching unit 20 changes a communication function of the notification information communication unit 21 from the second communication function to the first communication function.

In a case where the communication method switching unit 20 changes the communication function, the notification information creation unit 19 creates, based on meter information obtained from the notification information communication unit 21, notification information that shows breakdown of electricity supply from the basic power network 14 or that shows electricity supply restarts.

For example, in a case where the communication mode is switched to the ad hoc communication mode (second communication function), notification information that shows breakdown of electricity supply from the basic power network 14 is generated.

Figure 3:
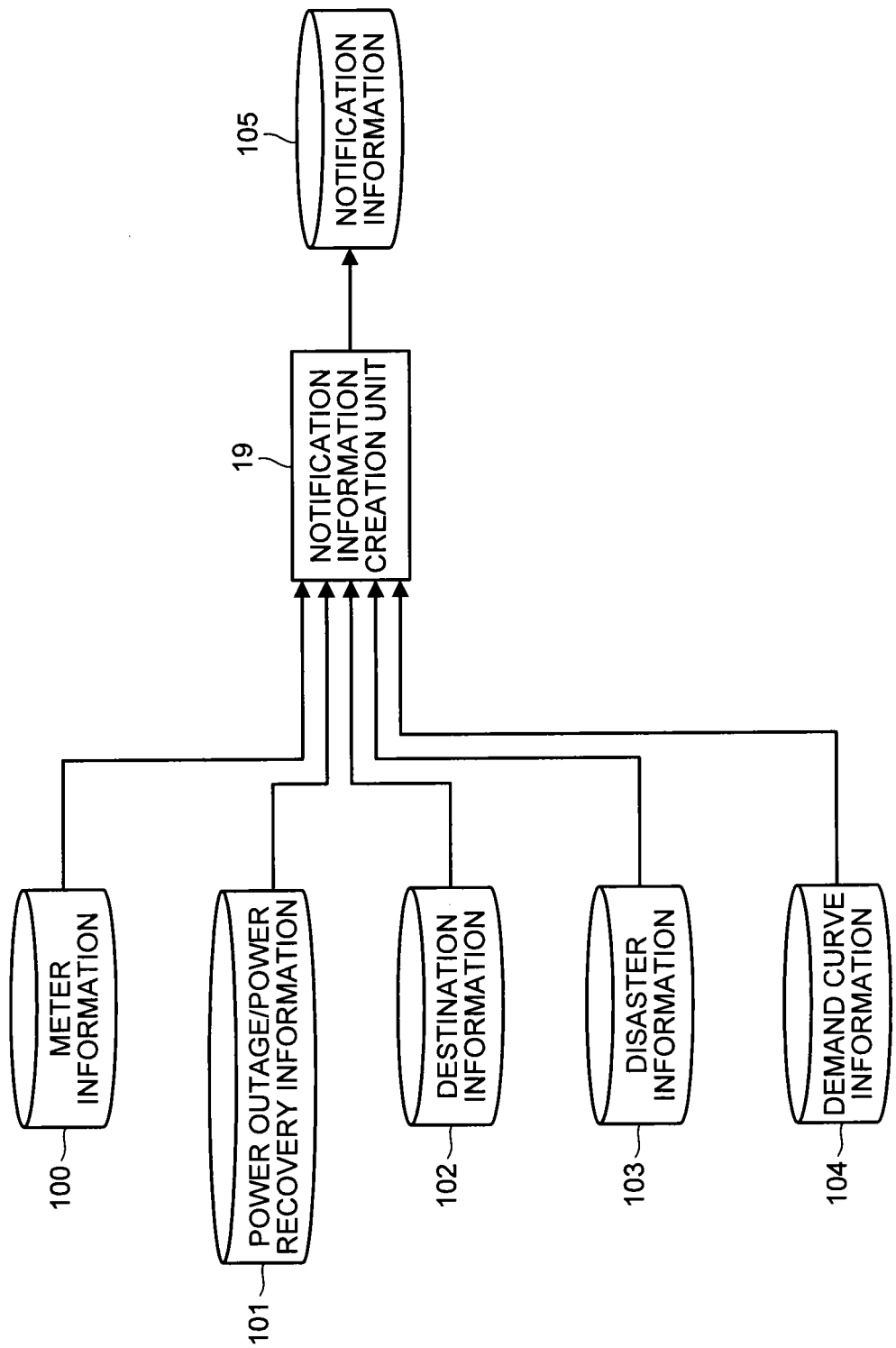
FIG. 3 is a block diagram showing the configuration of a notification information creation unit of a μEMS 1.

As shown in FIG. 3, the notification information creation unit 19 collects information (meter information 100, power outage/power recovery information 101, destination information 102, disaster information 103, demand curve information 104) obtained from the smart meter 50, the storage 17, and the operation receiving unit 25 to thereby create notification information 105.

The meter information 100 includes an identifier (apparatus ID) of the smart meter 50 and information ("0" for stop, "1" for running, etc.) on the status of the meter, and is breakdown detection information that shows the smart meter 50 in a particular location breaks down.

The power outage/power recovery information 101 is correspondence information between power outage time or power outage recovery time and a voltage value at that time, and is information that shows if the basic power network 14 supplies electricity to the smart meter 50.

The destination information 102 is a contact such as, for example, email address, which is used to contact a necessary party regarding a trouble in or recovery of the basic power network 14 or the basic communication network 2 in a case of disaster, and is previously registered (stored) in the storage 17.

As the disaster information 103, a status of a user himself, who uses the μEMS 1, or a status of disaster is input by using a key of the operation receiving unit 25 or by selecting from GUIs.

The demand curve information 104, which is trend (time-series data) of electricity consumption every day stored in the storage 17, is information, which is used to compare the latest data to the previous data at the same time point every time new meter data is received, and to determine a behavior distinctly different from that of usual (meter data having value larger than predetermined range) as a trouble.

In a case where it is confirmed that the notification information 105 generated by the notification information creation unit 19 has a predetermined trouble, the communication method switching unit 20 transmits a control signal (command) for switching a communication method (communication function) to the communication relaying apparatus 30 and the moving vehicle 4 via the notification information communication unit 21.

The control instruction (control command) may be included in the notification information 105 and transmitted, or may be transmitted independent of the notification information 105.

Because a communication method is not changed at this time, wireless communication with the moving vehicle 4 is communication based on, for example, the infrastructure communication mode.

Note that, because the μEMS 1 is connected to the communication relaying apparatus 30 via a LAN, a control instruction (control command) may be transmitted via a LAN (wired communication).

The connected device electricity managing unit 23 regulates supply-demand balance of electricity of a connected device based on information obtained when a disaster occurs.

Figure 4:
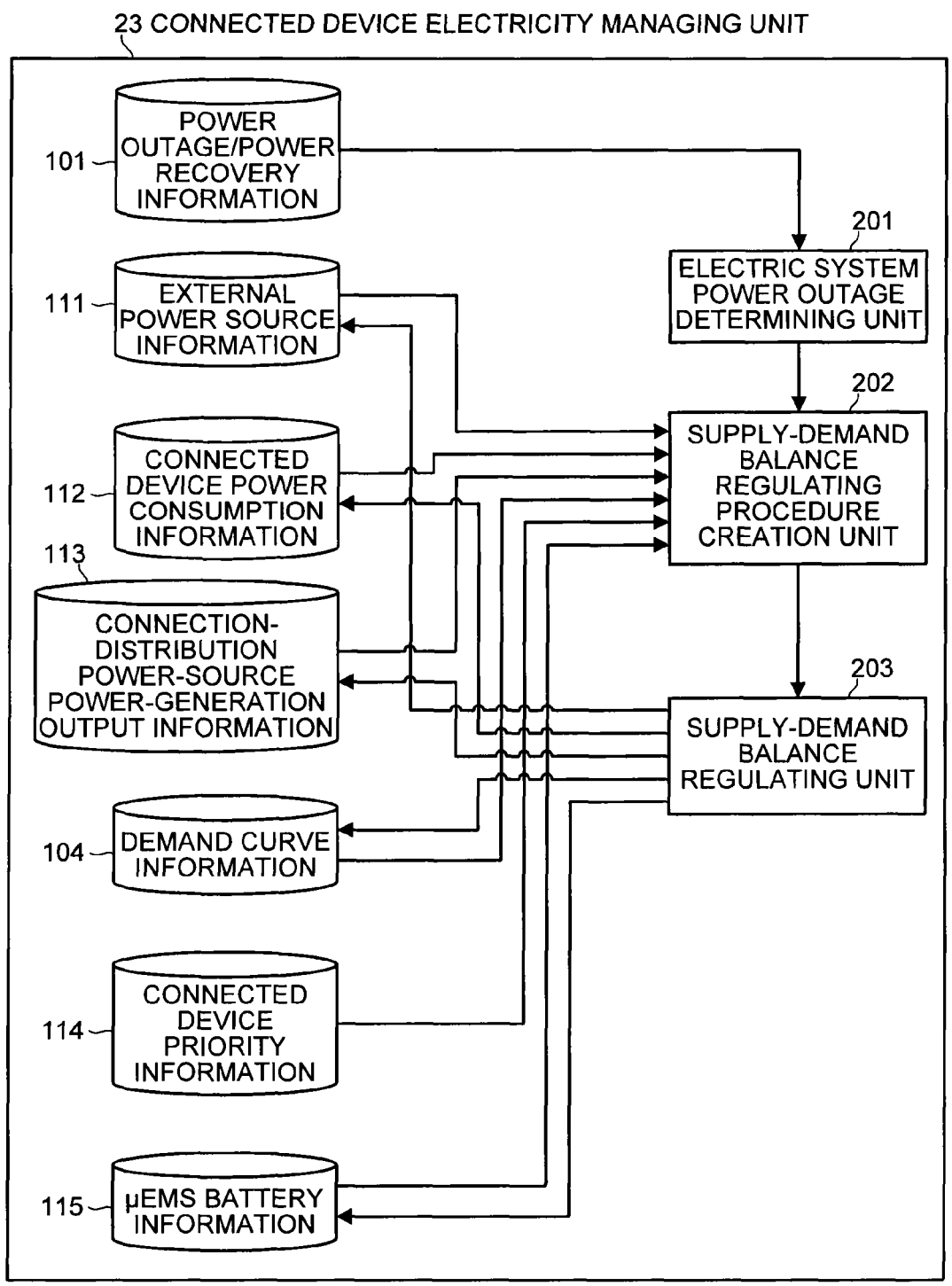
FIG. 4 is a block diagram showing the configuration of a connected device electricity managing unit.

More specifically, as shown in FIG. 4, the connected device electricity managing unit 23 includes an electric system power outage determining unit 201, the supply-demand balance regulating procedure creation unit 202, and a supply-demand balance regulating unit 203.

In a case where a power outage occurs in the smart meter 50, the electric system power outage determining unit 201 determines if a power outage occurs or not based on the power outage/power recovery information 101 from the monitoring unit 26 in order to manage electricity of in-house equipment (electromagnetic cooker, exhaust fan, air conditioner, etc.) connected to the smart meter 50.

In a case where the electric system power outage determining unit 201 determines "power outage occurs", the supply-demand balance regulating procedure creation unit 202 creates a supply-demand balance regulating procedure based on information (external power source information 111, connected device power consumption information 112, connection-distribution power-source power-generation output information 113, demand curve information 104, connected device priority information 114, μEMS battery information 115) obtained from the respective apparatuses and the respective devices connected to the μEMS 1.

The respective information is stored in the storage 17 once, and retrieved when creating a supply-demand balance regulating procedure.

The external power source information 111 is information showing if electricity supplied from the basic power network 14 is used, information showing if electricity from the dispersed power sources 3 or an in-house electric generator is used because supply from the basic power network 14 stops, or the like.

The connected device power consumption information 112 is information showing power consumption of in-house electronic devices.

For example, AA W (watt) for the μEMS, BB W for the smart meter, CC W for a lighting apparatus, DD W for a refrigerator, and the like are stored in the storage 17 in form of a table.

A communication function between the above-mentioned in-house devices and the μEMS 1 is provided, and the μEMS 1 obtains the connected device power consumption information 112 from the respective devices in a lump, and creates a table.

The connection-distribution power-source power-generation output information 113 is information showing how much electricity, which can be supplied from the dispersed power sources 3 to the house, remains.

The demand curve information 104 shows temporal change of electricity consumption every day, i.e., trend (time-series data).

The connected device priority information 114 is information showing priority for supplying electricity to in-house electronic devices. The μEMS has the highest priority, the smart meter has the second highest priority, and priority of other apparatuses (lighting apparatus, refrigerator, etc.) may be set as desired.

The μEMS battery information 115 shows remaining capacity of the battery 18 mounted in the μEMS 1.

That is, priority of devices, to which electricity is supplied from electricity sources (for example, dispersed power sources 3, moving vehicle 4, etc.) other than the basic power network 14 via the smart meter 50 when a trouble occurs in the basic power network 14, is set as the connected device priority information 114, and the connected device priority information 114 is previously stored in the storage 17.

The supply-demand balance regulating unit 203 transmits the supply-demand balance regulating procedure, which is created by the supply-demand balance regulating procedure creation unit 202, to the control requesting unit 29, which actually transmits a control instruction to the smart meter 50 managing electricity.

That is, the supply-demand balance regulating unit 203 regulates and controls supply-demand balance of electricity of the respective apparatuses and the respective devices based on the supply-demand balance regulating procedure, which is generated by the supply-demand balance regulating procedure creation unit 202.

The moving vehicle 4 is an information communication device or an electricity supplying apparatus having a self-power-generating function, and can be a moving power source in a case of breakdown of electricity infrastructures.

The moving vehicle 4 includes a notification information communication unit 41, a communication method switching unit 42, a peripheral information creation unit 43, a storage 44, a power generation unit 45, and the like.

Contact (destination such as email address, for example), which is used to contact a necessary contact party regarding a trouble in or recovery of the basic power network 14 or the basic communication network 2, is previously stored in the storage 44.

The notification information communication unit 41 transmits/receives notification information to/from the μEMS 1 and the communication relaying apparatus 30.

The notification information communication unit 41 has the wireless LAN communication function of the infrastructure mode and the ad hoc mode, and transmits/receives notification information to/from another apparatus by means of a communication function switched by the communication method switching unit 42.

That is, the notification information communication unit 41 has the first communication function of communicating with another apparatus via a basic network such as the basic communication network 2 normally, and the second communication function of communicating with another apparatus (moving vehicle 4, etc.) without using the basic network.

Further, the notification information communication unit 41 functions as a transmitting unit configured to transmit information on a peripheral device, which is created by the peripheral information creation unit 43, to a contact retrieved from the storage 44, by means of a switched communication function.

The communication method switching unit 42 switches the communication function performed by the moving vehicle 4.

Specifically, the communication function of the notification information communication unit 41 is switched. The communication method switching unit 42 switches the communication function of the notification information communication unit 41 to a communication method (one mode of infrastructure communication mode (first communication function) and ad hoc communication mode (second communication function)) depending on the infrastructure status informed (notified) by the μEMS 1, in a case of communicating with another apparatus (for example, communication relaying apparatus 30, etc.) via a wireless LAN.

That is, in a case where a trouble occurs in communication between the notification information communication unit 41 and the basic communication network 2, the communication method switching unit 42 switches the communication function of the notification information communication unit 41 from the first communication function to the second communication function, and, in a case where communication with the basic communication network 2 is recovered from the trouble, the communication method switching unit 42 switches the communication function of the notification information communication unit 41 from the second communication function to the first communication function.

The power generation unit 45 includes, for example, an engine, a generator, a battery, and the like, and generates power by itself without using electricity supplied from the basic power network 14.

In a case where the notification information communication unit 41 receives an instruction, which instructs the peripheral smart meter 50 to supply electricity, by means of the ad hoc mode (second communication function) communication, the power generation unit 45 functions as an electricity supplying unit for supplying electricity to the smart meter 50.

In a case where the communication method switching unit 42 switches the communication function to the second communication function, the peripheral information creation unit 43 creates information on a peripheral device of the moving vehicle 4, which is obtained by communication with the peripheral device by means of the second communication function.

Figure 5:
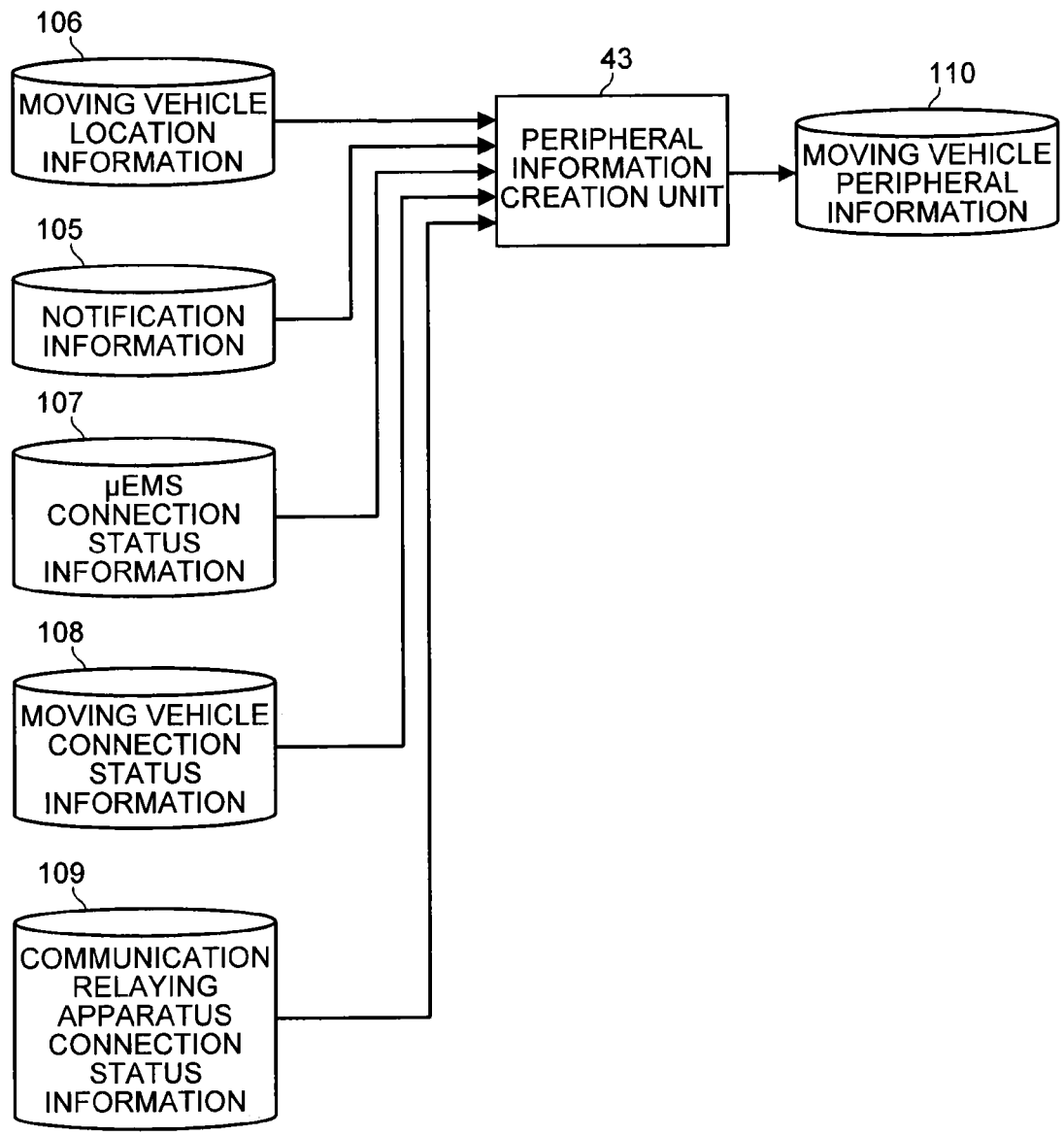
FIG. 5 is a block diagram showing the configuration of a moving vehicle.

More specifically, as shown in FIG. 5, the peripheral information creation unit 43 collects various information (notification information 105, moving vehicle location information 106, μEMS connection status information 107, moving vehicle connection status information 108, communication relaying apparatus connection status information 109) obtained by wireless communication between the notification information communication unit 41 and another apparatus to thereby create moving vehicle peripheral information 110.

The moving vehicle location information 106 is location information on itself and location information of a neighboring moving vehicle, which are obtained via a location information acquisition unit such as a GPS. The notification information 105 is information transmitted from an external device, i.e., for example, the μEMS 1 or the communication relaying apparatus 30 (see FIG. 3).

The μEMS connection status information 107 is information showing the communication function (wired communication or wireless communication using basic communication network 2, mode of wireless communication, etc.) of the μEMS 1 installed in the vicinity (radio wave range) of the moving vehicle 4.

The moving vehicle connection status information 108 is information showing the communication function of a neighboring moving vehicle, which is obtained by means of wireless communication. The communication relaying apparatus communication connection status information 109 is information showing the communication function of the communication relaying apparatus 30 installed in the neighborhood.

Here, with reference to FIG. 6 to FIG. 8, internal configuration of the communication method switching unit 20 of the μEMS 1, the communication method switching unit 42 of the moving vehicle 4, and the communication method switching unit 31 of the communication relaying apparatus 30 will be described.

Figure 6:
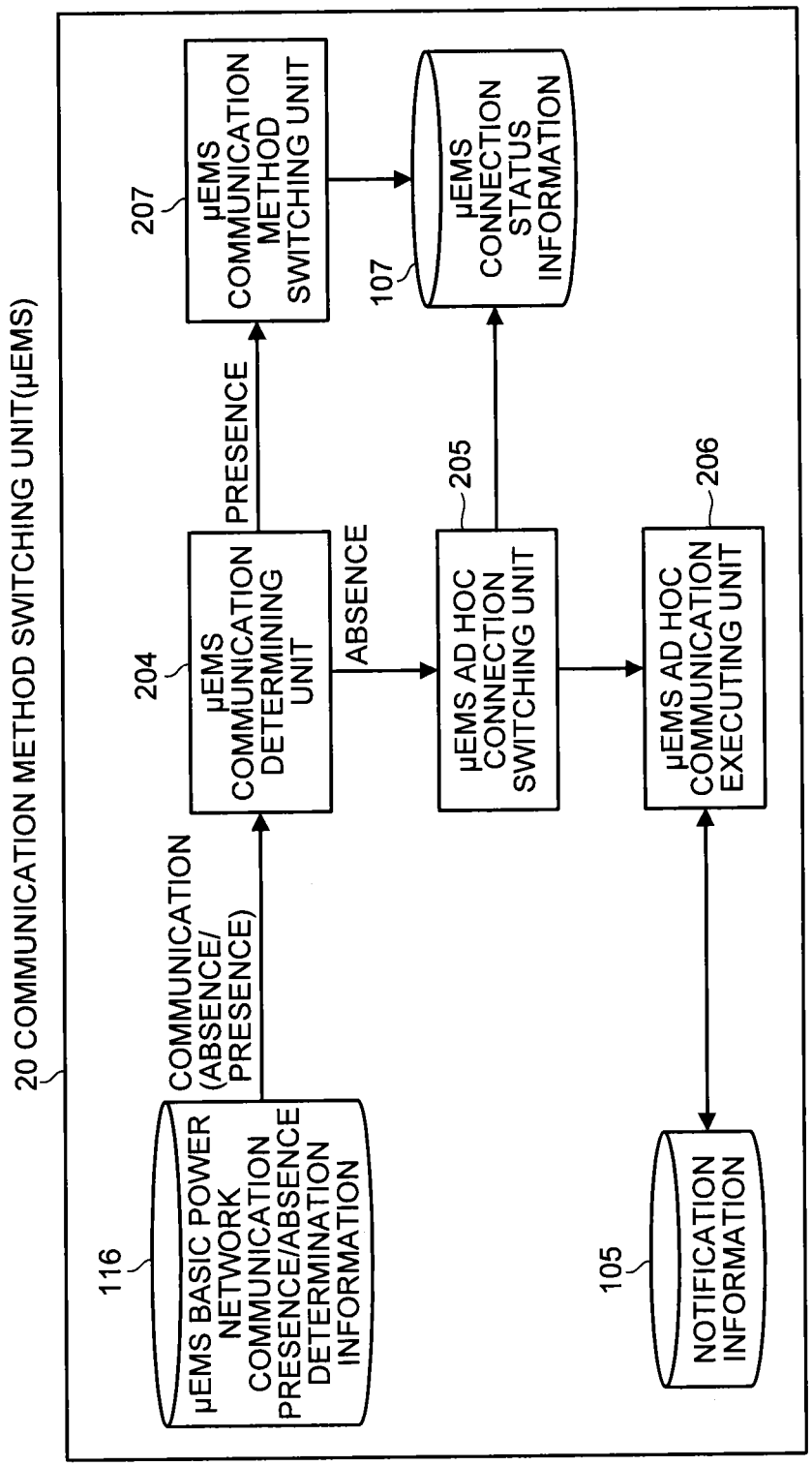
FIG. 6 is a diagram showing the internal configuration of a communication method switching unit of the μEMS.

As shown in FIG. 6, the communication method switching unit 20 of the μEMS 1 includes a μEMS communication determining unit 204, a μEMS ad hoc connection switching unit 205, a μEMS ad hoc communication executing unit 206, a μEMS communication method switching unit 207, and the like.

The μEMS communication determining unit 204 determines if communication with the basic communication network 2 is stopped based on μEMS basic communication network communication presence/absence determination information 116.

In a case where the μEMS communication determining unit 204 determines that communication with the basic communication network 2 is stopped (communication "absence"), the μEMS ad hoc communication switching unit 205 switches the communication function with the basic communication network 2 from a wired LAN to a wireless LAN, and, at the same time, switches the wireless LAN communication mode from the infrastructure communication mode to the ad hoc communication mode.

Then, the μEMS ad hoc connection switching unit 205 generates the μEMS connection status information 107, which shows the switched communication status of the μEMS 1, transmits the μEMS connection status information 107 to the outside, and stores the μEMS connection status information 107 in the storage 17.

The μEMS ad hoc communication executing unit 206 executes a communication function of the wireless LAN switched to the ad hoc communication mode by the μEMS ad hoc connection switching unit 205, transmits the notification information 105 to another apparatus and a predetermined destination.

In a case where the μEMS communication determining unit 204 determines that the basic communication network 2 restarts communication (communication "presence"), the μEMS communication method switching unit 207 switches the communication function with the basic communication network 2 from a wireless LAN to a wired LAN, and, at the same time, switches the wireless LAN communication mode from the ad hoc communication mode to the infrastructure communication mode.

Then, the μEMS communication method switching unit 207 generates the μEMS connection status information 107, which shows the switched communication status of the μEMS 1, transmits the μEMS connection status information 107 to the outside, and stores the μEMS connection status information 107 in the storage 17.

According to this configuration, the μEMS 1 determines presence/absence of communication with the basic communication network 2, which is a communication network used normally, switches to the ad hoc connection when communication is stopped, and executes ad hoc communication, whereby it is possible to communicate with peripheral devices and to transmit information.

Figure 7:
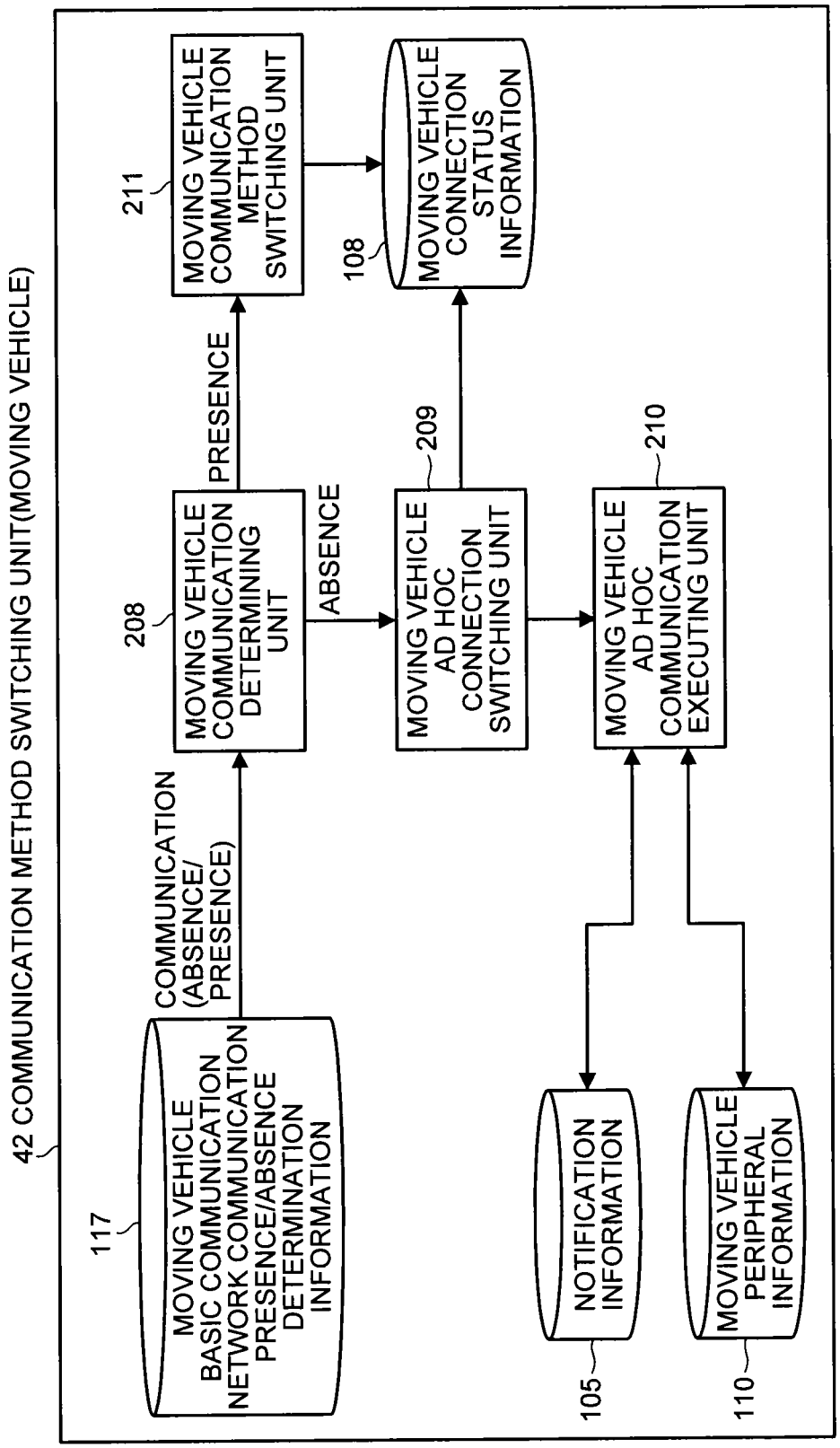
FIG. 7 is a diagram showing the internal configuration of a communication method switching unit of a moving vehicle.

As shown in FIG. 7, the communication method switching unit 42 of the moving vehicle 4 includes a moving vehicle communication determining unit 208, a moving vehicle ad hoc connection switching unit 209, a moving vehicle ad hoc communication executing unit 210, and a moving vehicle communication method switching unit 211.

The moving vehicle communication determining unit 208 determines if communication with the basic communication network 2 is stopped or not based on moving vehicle basic communication network communication presence/absence determination information 117, which is obtained by wireless communication with the communication relaying apparatus 30.

If the moving vehicle communication determining unit 208 determines that communication with the basic communication network 2 is stopped (communication "absence"), the moving vehicle ad hoc connection switching unit 209 switches the wireless LAN communication mode with the communication relaying apparatus 30 from the infrastructure communication mode to the ad hoc communication mode.

Then, the moving vehicle ad hoc connection switching unit 209 generates the moving vehicle connection status information 108, which shows the switched communication status of the moving vehicle 4, and transmits the moving vehicle connection status information 108 to peripheral devices (communication relaying apparatus 30, another moving vehicle, etc.).

The moving vehicle ad hoc communication executing unit 210 executes a communication function of the wireless LAN, which is switched to the ad hoc communication mode by the moving vehicle ad hoc connection switching unit 209, and transmits the notification information 105 and the moving vehicle peripheral information 110 to a neighboring apparatus.

In a case where the moving vehicle communication determining unit 208 determines that the basic communication network 2 restarts communication (communication "presence"), the moving vehicle communication method switching unit 211 switches the wireless LAN communication mode from the ad hoc communication mode to the infrastructure communication mode, establishes wireless LAN communication with the communication relaying apparatus 30, and restarts communication with the basic communication network 2.

Then, the moving vehicle communication method switching unit 211 generates the moving vehicle connection status information 108, which shows the switched communication status of the moving vehicle 4, and transmits the moving vehicle connection status information 108 to another apparatus by means of wireless LAN communication.

According to this configuration, presence/absence of communication with the basic communication network 2, which is a communication network used by the moving vehicle 4 normally, is determined, the communication mode is switched to the ad hoc connection when communication is "absence", and ad hoc communication is executed, whereby it is possible to communicate with peripheral devices (neighboring μEMS 1, another moving vehicle, etc.) and to transmit information.

Figure 8:
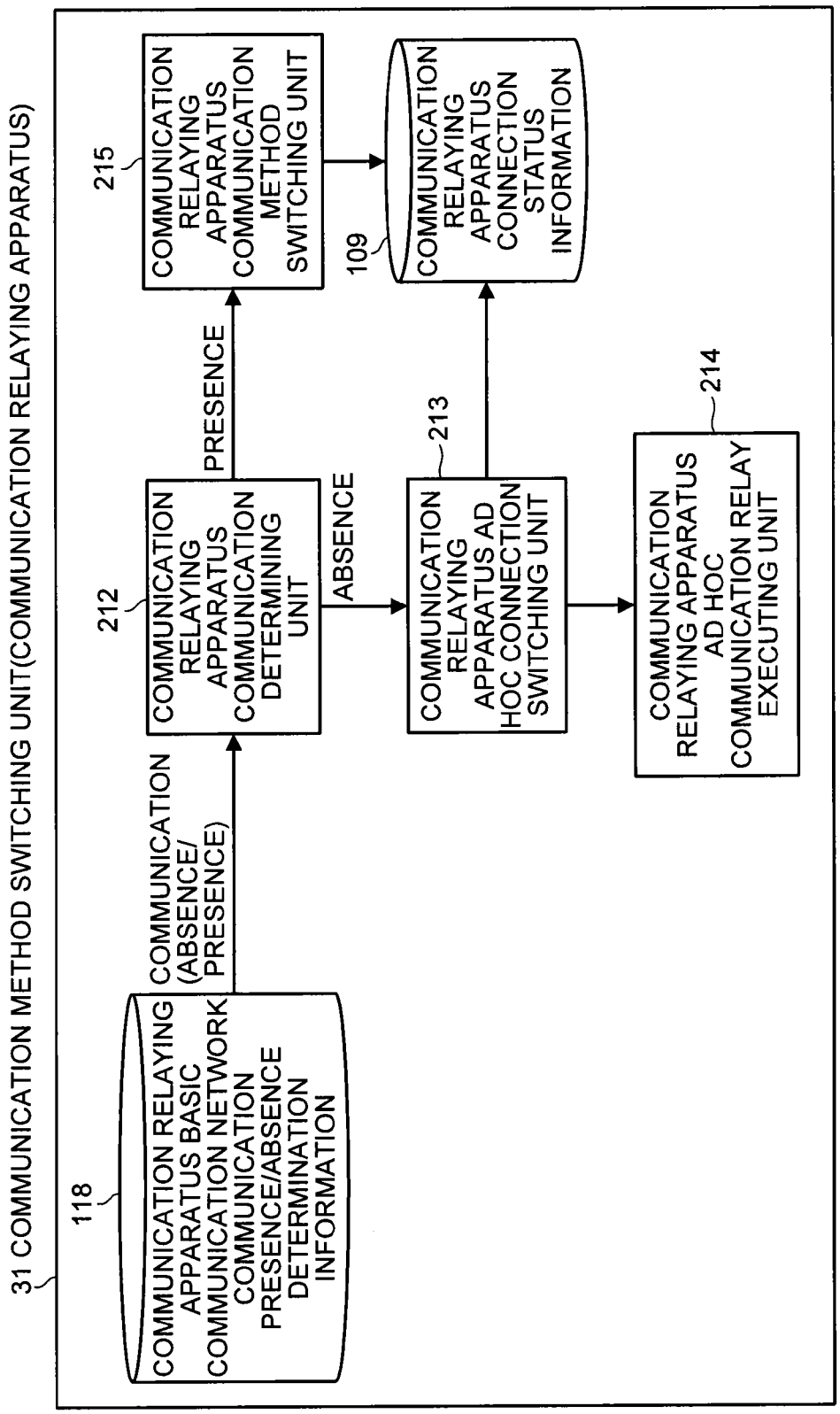
FIG. 8 is a diagram showing the internal configuration of a communication method switching unit of a communication relaying apparatus.

As shown in FIG. 8, the communication method switching unit 31 of the communication relaying apparatus 30 includes a communication relaying apparatus communication determining unit 212, a communication relaying apparatus ad hoc connection switching unit 213, a communication relaying apparatus ad hoc communication relay executing unit 214, and a communication relaying apparatus communication method switching unit 215.

The communication relaying apparatus communication determining unit 212 determines if communication with the basic communication network 2 is stopped or not based on communication relaying apparatus basic communication network communication presence/absence determination information 118, which is obtained by communication with the basic communication network 2.

In a case where the communication relaying apparatus communication determining unit 212 determines that communication with the basic communication network 2 is stopped (communication "absence"), the communication relaying apparatus ad hoc connection switching unit 213 switches communication with the μEMS 1 from a wired LAN to a wireless LAN, and switches the wireless LAN communication mode from the infrastructure communication mode to the ad hoc communication mode.

Then, the communication relaying apparatus ad hoc connection switching unit 213 generates the communication relaying apparatus connection status information 109, which shows the switched communication status of the communication relaying apparatus 30, and transmits the communication relaying apparatus connection status information 109 to peripheral devices (μEMS 1, moving vehicle 4, etc.).

The communication relaying apparatus ad hoc communication relay executing unit 214 executes the communication function of the wireless LAN, which is switched to the ad hoc communication mode by the communication relaying apparatus ad hoc connection switching unit 213, and relays wireless communication with a neighboring apparatus.

In a case where the communication relaying apparatus communication determining unit 212 determines that the basic communication network 2 restarts communication (communication "presence"), the communication relaying apparatus communication method switching unit 215 switches the communication function with the basic communication network 2 from a wireless LAN to a wired LAN, and, at the same time, switches the wireless LAN communication mode from the ad hoc communication mode to the infrastructure communication mode.

Then, the communication relaying apparatus communication method switching unit 215 generates the communication relaying apparatus connection status information 109, which shows the switched communication status of the communication relaying apparatus 30, and transmits the communication relaying apparatus connection status information 109 to the outside.

According to this configuration, presence/absence of communication with the basic communication network 2, which is a communication network used by the communication relaying apparatus 30 normally, is determined, the communication mode is switched to the ad hoc connection when communication is "absence", ad hoc communication is executed, whereby it is possible to communicate with peripheral devices (neighboring moving vehicle 4, μEMS 1, etc.) and to transmit information.

Here, operations of the information sharing system of this embodiment will be described. Because, as failure occurrence statuses, there can be a first case in which a failure occurs only in the basic power network 14, a second case in which a failure occurs only in the basic communication network 2, and a third case in which failures occur in both the basic power network 14 and the basic communication network 2, the respective cases will be described.

(First Case: Case in which Failure Occurs Only in Basic Power Network 14)

Figure 9:
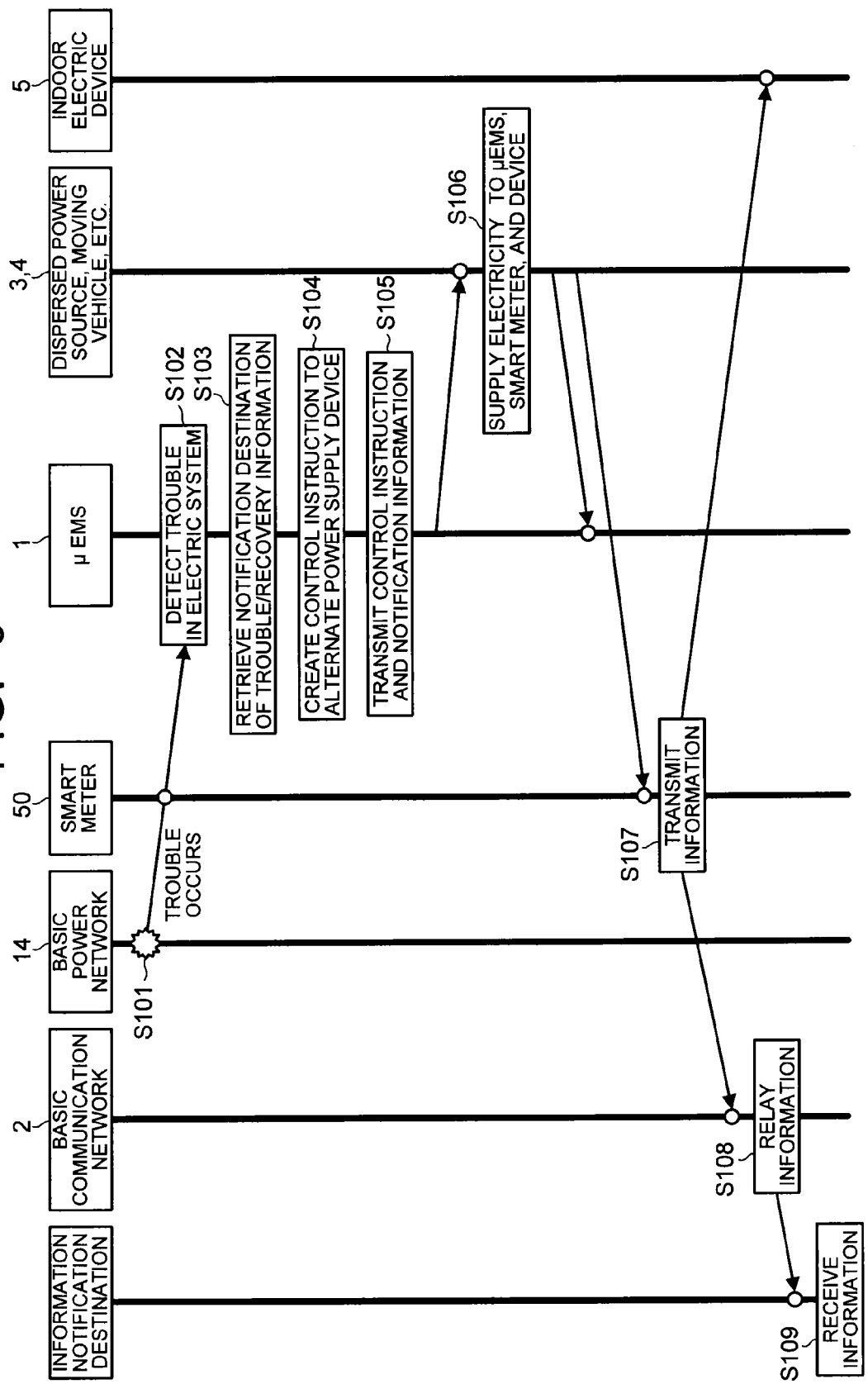
FIG. 9 is a flowchart showing an operational example of a first case when a trouble occurs in a basic power network.

Next, with reference to FIG. 9, a specific operational example (operational example of first case) of the information sharing system in a case where a trouble occurs in the basic power network 14 will be described.

The monitoring unit 26 of the μEMS 1 analyzes meter data obtained from the smart meter 50, and executes monitoring behavior. In a case where a trouble occurs in the basic power network 14 (Step S101), the basic power network 14 stops supplying electricity to the smart meter 50, and data, which indicates a value larger than a preset threshold, is detected in meter data that the monitoring unit 26 obtains from the smart meter 50.

Then, the monitoring unit 26 detects a trouble in an electric system (Step S102), starts the battery 18, runs by using power supplied from the battery 18, and notifies the notification information creation unit 19 and the connected device electricity managing unit 23 of a trouble in an electric system.

In the connected device electricity managing unit 23, which is notified of a trouble in an electric system, the supply-demand balance regulating procedure creation unit 202 creates supply-demand balance regulating procedure such that electricity is preferentially supplied to a device, to which electricity should be preferentially supplied out of the indoor electric devices 5, based on the external power source information 111, the connected device power consumption information 112, the connection-distribution power-source power-generation output information 113, the demand curve information 104, the connected device priority information 114, and the μEMS battery information 115, and transmits the supply-demand balance regulating procedure to the smart meter 50.

The meter controller unit 52 of the smart meter 50 supplies electricity to an appropriate device of the appropriate indoor electric devices 5 based on the received supply-demand balance regulating procedure.

Note that, in a case where a secondary battery mounted in an electric vehicle (moving vehicle 4), which is parked in the vicinity of a house or a school, is electrically connected to the indoor electric device 5, the external power source information 111 includes information on an electricity amount where the built-in secondary battery is considered as an external power source.

The notification information creation unit 19, which is notified of a trouble in an electric system, retrieves various information (see FIG. 3) including a notification destination of trouble/recovery information from the storage 17 (Step S103), creates control instructions to the dispersed power sources 3, the moving vehicle 4, the indoor electric device 5, and the like and notification information to the notification destination (Step S104), and transmits the notification information on a trouble occurred in the basic power network 14 and the control instructions to the destinations, respectively (Step S105).

After receiving the control instructions from the μEMS 1, each of the dispersed power sources 3, the moving vehicle 4, and the indoor electric device 5 wirelessly communicates with the μEMS 1 installed in the vicinity thereof to thereby supply electricity to the μEMS 1, the smart meter 50, and other priority devices, which are devices having higher priority in case of trouble (Step S106).

The smart meter 50, to which electricity is supplied, continues measurement, and transmits measured meter data and notification information to the indoor electric device 5 and the basic communication network 2 (Step S107).

The basic communication network 2 receives the notification information from the smart meter 50, relays the notification information (Step S108), and transmits the notification information to a notification destination (destination).

The notification destination receives the notification information from the smart meter 50 by means of the ad hoc communication (Step S109).

According to the operational example of the first case, in a case where electricity supply to the smart meter 50 in each house is stopped because of a trouble in the basic power network 14, the smart meter 50 in each house transmits notification information to a previously-registered contact, and an information notification destination, which receives the notification information, is capable of grasping the status of each house.

Further, in a case where electricity supply, from the basic power network 14 to equipment in which the smart meter 50 is installed, is stopped, operations of the μEMS 1 and the smart meter 50 are maintained by using power supplied from the battery 18 attached to the μEMS 1, and the connected device electricity managing unit 23 manages micro electricity of external power sources of electric vehicles and the like and distributed power sources, whereby it is possible to supply electricity from the external power sources and the distributed power sources to priority devices out of the indoor electric devices 5 via the smart meter 50 until electricity supply from the basic power network 14 is recovered.

(Second Case: Case where Failure Occurs Only in Basic Communication Network 2)

In a case where a failure occurs in the basic communication network 2, which is a communication network used normally, similar to the case before the failure occurs, it is required that a predetermined destination could be notified of the disaster status of the location in which the smart meter is installed, the power outage/power recovery status, a trouble in a demand curve, and the like, in real time, that moving vehicles could share the moving vehicle peripheral information 110, and that the connected device electricity managing unit 23 form a local supply network and electricity could be supplied until the basic power network 14 is recovered.

In view of this, according to the information sharing system of this embodiment, in a case where a failure occurs in the basic communication network 2 because of disaster or the like, the network communication unit 54 of the smart meter 50 detects a trouble in the basic communication network 2 when communication with the MDMS 60 is stopped, generates the μEMS basic communication network communication presence/absence determination information 116, and transmits the μEMS basic communication network communication presence/absence determination information 116 to the notification information communication unit 21 of the μEMS 1 via the LAN 57.

The notification information communication unit 21 of the μEMS 1 provides the μEMS basic communication network communication presence/absence determination information 116, which is received from the smart meter 50, to the communication method switching unit 20.

The μEMS communication determining unit 204 of the communication method switching unit 20 detects a failure (trouble) occurred in the basic communication network 2 based on the μEMS basic communication network communication presence/absence determination information 116.

Then, the μEMS ad hoc connection switching unit 205 switches the communication function of the μEMS 1 to the ad hoc communication. The μEMS ad hoc communication executing unit 206 executes the switched ad hoc communication, and shares information with another apparatus.

After that, if the μEMS communication determining unit 204 determines that a failure of the communication infrastructure is resolved, the μEMS communication method switching unit 207 switches the communication function to the communication function (infrastructure communication) used normally, which uses the basic communication network 2.

Further, in the moving vehicle 4, in a case where a failure occurs in the basic communication network 2, the notification information communication unit 41, which executes communication via the basic communication network 2, detects a communication trouble in the basic communication network 2, and generates the moving vehicle basic communication network communication presence/absence determination information 117.

The moving vehicle communication determining unit 208 detects breakdown of the basic communication network 2 with reference to the moving vehicle basic communication network communication presence/absence determination information 117, which is generated by the notification information communication unit 41.

In this case, the moving vehicle ad hoc connection switching unit 209 of the moving vehicle 4 switches the wireless LAN communication function to the ad hoc communication mode.

As a result, the moving vehicle ad hoc communication executing unit 210 executes the switched ad hoc communication, and shares information with a neighboring apparatus.

After that, if the moving vehicle communication determining unit 208 determines that a failure in the communication infrastructure is resolved, the moving vehicle communication method switching unit 211 switches the communication function to the communication (infrastructure communication) mode with another apparatus via the basic communication network 2.

Further, in the communication relaying apparatus 30, in a case where a failure (trouble) occurs in the basic communication network 2, the communication relaying apparatus communication determining unit 212 of the communication relaying apparatus 30 itself detects a trouble in communication via the basic communication network 2, and the communication relaying apparatus ad hoc connection switching unit 213 switches the communication relaying apparatus 30 to the ad hoc communication without using the basic communication network 2.

As a result, the communication relaying apparatus ad hoc communication relay executing unit 214 executes the ad hoc communication with a neighboring device.

After that, if the communication relaying apparatus communication determining unit 212 determines that a failure in the communication infrastructure is resolved, the communication relaying apparatus communication method switching unit 215 switches the communication function to the communication method via the basic communication network 2.

Further, in a case of switching the communication function, the μEMS ad hoc connection switching unit 205 and the μEMS communication method switching unit 207 of the μEMS 1 write the current communication method in the μEMS connection status information 107.

In a case of switching the communication function, the moving vehicle ad hoc connection switching unit 209 and the moving vehicle communication method switching unit 211 of the moving vehicle 4 write the current communication function status in the moving vehicle connection status information 108.

In a case of switching the communication function, the communication relaying apparatus ad hoc connection switching unit 213 and the communication relaying apparatus communication method switching unit 215 of the communication relaying apparatus 30 write information showing the current communication function status in the communication relaying apparatus connection status information 109.

The μEMS connection status information 107, the moving vehicle connection status information 108, and the communication relaying apparatus connection status information 109 are shared by moving vehicles, and are useful in recovering the basic communication network 2.

As described above, in a case where the basic communication network 2 used normally is stopped, an information sharing system 1 of the smart grid, which is enabled by the micro electricity management and the micro communication network, is switched to the ad hoc communication mode automatically (autonomously) by the communication method switching units 20, 31, 42 mounted on the μEMS 1, the communication relaying apparatus 30, the moving vehicle 4, and the like, and the devices directly communicate with each other without using an access point of the basic communication network 2, whereby neighboring devices continue communication and are capable of exchanging information even if a trouble occurs in the basic network.

Here, with reference to FIG. 10, a specific operational example (specific operational example of second case) of the information sharing system in a case where a failure (trouble) occurs in the basic communication network 2 will be described.

For example, in a case where a failure (breaking of wire, or breakdown) occurs in the basic communication network 2 (Step S201), a device such as the communication relaying apparatus 30 or the neighboring moving vehicle 4 detects the trouble in the basic communication network 2 because communication with the basic communication network 2 is stopped (Step S202).

Then, each device switches the wireless communication function of itself to the ad hoc communication mode (Step S203).

Meanwhile, the MDMS 60 stops communication with the smart meter 50 because a trouble occurs in the basic communication network 2. The network communication unit 54 of the smart meter 50 detects a trouble in the basic communication network 2 because communication with the MDMS 60 is stopped (Step S204).

Then, the smart meter 50 notifies the notification information communication unit 21 of the μEMS 1 of the detected trouble in the basic communication network 2 via the LAN 57.

In response to the notification, the communication method switching unit 20 of the μEMS 1 switches the communication function of the notification information communication unit 21 to the ad hoc communication mode (Step S205).

After switching, the notification information creation unit 19 retrieves various information (see FIG. 3) including a notification destination of trouble/recovery information from the storage 17, creates control instructions to the dispersed power sources 3, the moving vehicle 4, the indoor electric device 5, and the like, and notification information to contacts (information notification destinations) (Step S206), and transmits the notification information to each destination (Step S207).

When the moving vehicle 4 or the communication relaying apparatus 30 in the vicinity of the μEMS 1 receives the notification information from the μEMS 1 by means of the ad hoc communication with the μEMS 1, the moving vehicle 4 or the communication relaying apparatus 30 relays the notification information (Step S208), and transmits the notification information to the contact (information notification destination).

The information notification destination receives the notification information relayed by the moving vehicle 4 or the communication relaying apparatus 30 (Step S209).

According to the operational example of the second case, when a trouble occurs in the basic communication network 2 and when communication between the basic communication network 2 and the communication relaying apparatus 30 is stopped, the communication relaying apparatus 30 automatically switches the wireless communication function to the ad hoc communication mode, directly communicates with the smart meter 50 in a neighboring house, the μEMS 1, the moving vehicle 4, and the like, and notifies them that the wireless communication function is switched to the ad hoc communication mode, and the μEMS 1, which received the notification, transmits notification information to a previously registered contact, whereby the information notification destination is capable of grasping a trouble in communication with the basic communication network 2 based on notification information from the communication relaying apparatus 30, the in-house μEMS 1, the moving vehicle 4, and the like.

That is, in a case of breakdown of the basic communication network 2 used normally, each of the communication method switching unit 20 provided in the μEMS 1, the communication method switching unit 42 provided in the moving vehicle 4, and the communication method switching unit 31 provided in the communication relaying apparatus 30 automatically switches the communication function of each device to the ad hoc communication mode, structures a wireless communication network with neighboring devices without using an access point, and tries to share information as much as possible, whereby it is possible to transmit and share disaster information rapidly and to respond to a disaster rapidly and efficiently.

(Third Case: Case where Failures Occur in Both Basic Power Network 14 and Basic Communication Network 2)

A case where a disaster such as an earthquake occurs in the smart grid, and where failures such as breaking of wire occur in the basic power network 14 and the basic communication network 2 will be described.

The meter data retrieving unit 53 of the smart meter 50 installed in each house retrieves meter data from the meter 55 successively.

The meter data retrieving unit 53 transmits the retrieved meter data to the μEMS 1 via the meter data transmission unit 51.

In a case where a failure occurs in the basic communication network 2, the network communication unit 54 of the smart meter 50 detects a trouble in the basic communication network 2 because communication with the MDMS 60 is stopped, generates the μEMS basic communication network communication presence/absence determination information 116, and transmits the μEMS basic communication network communication presence/absence determination information 116 to the notification information communication unit 21 of the μEMS 1 via the LAN 57.

The notification information communication unit 21 of the μEMS 1 provides the μEMS basic communication network communication presence/absence determination information 116, which is received from the smart meter 50, to the communication method switching unit 20.

The μEMS communication determining unit 204 of the communication method switching unit 20 detects a failure (trouble) occurred in the basic communication network 2 based on the μEMS basic communication network communication presence/absence determination information 116.

Then, the μEMS ad hoc connection switching unit 205 switches the communication function of the μEMS 1 from the infrastructure communication to the ad hoc communication. The μEMS ad hoc communication executing unit 206 executes the switched ad hoc communication, and shares information with neighboring apparatuses (communication relaying apparatus 30, moving vehicle 4, etc.) by means of small-area communication.

Further, the receiving unit 28 of the μEMS 1 receives meter data from the smart meter 50. The receiving unit 28 inputs the meter data in the demand curve creation unit 27.

The demand curve creation unit 27 adds new meter data to a meter data table, in which measurement time is in association with an electricity value, creates the demand curve information 104 (see FIG. 3), which is a graph showing information in the table, and stores the demand curve information 104 in the storage 17.

Note that the meter data table may be stored in the storage 17 as it is, and a graph may be created only when it is displayed.

The demand curve information 104 is information showing a power consumption tendency (characteristics) in a predetermined period of a device connected to the smart meter 50.

The monitoring unit 26 monitors the update status of the demand curve information 104 updated by the storage 17, and compares the demand curve information 104 to the previous demand curve if the demand curve information 104 is updated, whereby the monitoring unit 26 determines that a trouble occurs if there is variation larger than a threshold preset in the storage 17.

That is, the monitoring unit 26 determines if there is a trouble in a demand curve or not in accordance with the above-mentioned rule. The previous demand curve is a demand curve generate by, for example, the previous day, and is stored such that the name of the previous demand curve is different from the name of the demand curve generated on the current day.

If the monitoring unit 26 determines that a trouble occurs in the demand curve information 104 as the result of comparison, the monitoring unit 26 notifies the notification information creation unit 19 of that.

In a case where the monitoring unit 26 compares the demand curve information 104 to the threshold (previous demand curve) of the storage 17 and where the meter data is out of a threshold range, the monitoring unit 26 determines that a trouble occurs, stores trouble information in the storage 17 as the meter information 100 and the power outage/power recovery information 101, and notifies the notification information creation unit 19 of a message indicating that a trouble occurs.

In response to the notification from the monitoring unit 26, the notification information creation unit 19 collects information (see FIG. 3), which is obtained from the respective devices, for each destination previously stored (registered) in the storage 17, and creates the notification information 105.

That is, when the notification information creation unit 19 receives a message indicating that a trouble occurs, the notification information creation unit 19 retrieves the meter information 100, the power outage/power recovery information 101, the destination information 102, the disaster information 103, and the demand curve information 104 from the storage 17, and collects each pieces of information, to thereby create the notification information 105.

The destination information 102 shows a destination, which is notified of occurrence of a trouble, and which may be previously input by a user of the μEMS 1. Alternatively, an emergency notification information notification destination such as a fire station or a police station may be previously registered in the storage 17 of the μEMS 1, and may be retrieved.

A user of the µEMS 1 inputs the disaster information 103 by using the operation receiving unit 25 when a trouble occurs, and the disaster information 103 is stored in the storage 17.

The notification information creation unit 19 transmits the created notification information 105 from the notification information communication unit 21 to the smart meter 50 via the LAN 57.

Further, the notification information 105 is transmitted to a preset destination such as another µEMS, the moving vehicle 4, or the like, by means of the ad hoc communication by email.

If a trouble occurs in communication when the moving vehicle 4 such as an electric vehicle, an emergency vehicle, or the like communicates with another apparatus via the basic communication network 2, the moving vehicle 4 detects a trouble in the basic communication network 2, and the communication method switching unit 42 switches the communication function from the infrastructure communication to the ad hoc communication.

If the notification information communication unit 41 receives the notification information 105 to the notification information communication unit 41 itself by switching the communication function to the ad hoc communication, the peripheral information creation unit 43 of the moving vehicle 4 creates peripheral information, which includes location information of itself, based on the notification information 105, and updates the existing moving vehicle peripheral information 110.

In this case, location information of itself obtained via a location information acquisition unit such as a GPS, the moving vehicle location information 106, which is location information of a neighboring moving vehicle obtained from the neighboring moving vehicle, the communication connection status information 107 indicating the communication method of the neighboring µEMS 1, the moving vehicle connection status information 108 indicating the communication method of a neighboring moving vehicle, the communication relaying apparatus connection status information 109 indicating the communication method of the neighboring communication relaying apparatus 30, the moving vehicle peripheral information 110, which is peripheral information of a neighboring moving vehicle, and the like are used.

The moving vehicle peripheral information 110 is shared by means of the ad hoc communication, and is used for rapid recovery and aid in a case of occurrence of a trouble.

Meanwhile, in a case where electricity supply to each house, in which the µEMS 1 and the smart meter 50 are installed, is stopped, the µEMS 1 is powered by the battery 18, the monitoring unit 26 recognizes that power outage occurs, and the power outage/power recovery information 101 is generated.

Next, the supply-demand balance regulating procedure creation unit 202 of the connected device electricity managing unit 23 creates a supply-demand balance regulating procedure such that electricity supply to a device having lower priority is stopped and electricity is supplied to a device having higher priority depending on the capacity of a power source.

In this case, the external power source information 111 indicating presence/absence of connection of an external power source such as an electric vehicle, an electricity amount of an external power source, and the like, the connected device power consumption information 112 indicating power consumption of a device connected to the smart meter 50, the connection-distribution power-source power-generation output information 113 indicating power generation output information of a distributed power source connected to the smart meter 50, the demand curve information 104 created by the demand curve creation unit 27, the connected device priority information 114 managing electricity supply priority in a case of regulating supply-demand balance of electricity by a device connected to the smart meter 50, the µEMS battery information 115 managing charged amount of the battery 18 of the µEMS 1, and the like are used.

The supply-demand balance regulating procedure includes information on a regulation level, which indicates the regulation level of a device such as a cooling and heating machine whose power consumption can be regulated.

Note that, in a case of generating a supply-demand balance regulating procedure, the highest priority is assigned to securement of a power source for the µEMS 1, which is an interface between an external device and a device connected to the smart meter 50.

In this manner, even in a case of breakdown of electricity supply, information transmitting/receiving means for an external device and a device connected to the smart meter 50 is secured first of all.

The supply-demand balance regulating unit 203 transmits the generated supply-demand balance regulating procedure to the control requesting unit 29, and the generated supply-demand balance regulating procedure is transmitted to the smart meter 50, which actually manages electricity, as a control request.

When the meter controller unit 52 receives the control request from the µEMS 1, the smart meter 50 executes control based on the control request, that is, turns on/off the power source of an actually-connected device, and regulates an electricity amount.

According to the operational example of the third case, in a case where failures occur in both the basic power network 14 and the basic communication network 2 because disaster such as an earthquake occurs in the smart grid, and where a trouble in the basic network such as power outage or impossibility of communication is detected, by switching the communication function to the ad hoc communication without using the basic communication network 2, a small-area communication network with neighboring apparatuses is established, and the notification information 105, which is created by the notification information creation unit 19, is transmitted to a predetermined destination without using the basic communication network 2, whereby it is possible to notify of the disaster status of the location in which the meter is installed, the power outage/power recovery status, a trouble in a demand curve, and the like, in real time.

In addition, the moving vehicle 4 and other moving vehicles share the moving vehicle peripheral information 110, which is created in the peripheral information creation unit 43, whereby it is possible to execute aid and recovery rapidly and efficiently.

Further, in a case where electricity supply, from the basic power network 14 to equipment in which the smart meter is installed, is stopped, by using power supplied from the battery 18 attached to the µEMS 1, the connected device electricity managing unit 23 manages micro electricity of external power sources of electric vehicles and the like and distributed power sources, whereby it is possible to supply electricity from the external power sources and the distributed power sources until electricity supply from the basic power network 14 is recovered.

As described above, according to this embodiment, if a power network or a communication network in a stricken area is isolated from other systems in a case of disaster, it is possible to secure an alternate complementary communication network, a complementary in-house emergency power source, and the like, and an evacuation notification, aid, recovery, and the like may be realized smoothly.

Although some embodiments have been described above, those embodiments are described as examples, and do not intend to limit the scope of the invention.

Those novel embodiments may be embodied in other various modes, and may be variously omitted, substituted, and modified without departing from the scope of the invention.

Those embodiments and modification thereof are within the scope and the gist of the invention, and are within the scope of the invention described in the scope of claims and the equivalent thereof.

For example, the respective elements described in the above-mentioned embodiment may be realized by a program installed in a storage device such as a hard disk drive in a computer. Alternatively, a program may be stored in a computer-readable electronic medium, a computer may retrieve the program in the electronic medium, and the computer may realize the functions of the present invention.

As an electronic medium, for example, a recording medium such as a CD-ROM, a flash memory, a removal medium, or the like may be employed.

Further, the elements may be stored in different computers connected to each other via a network in a dispersed manner, respectively, and the computers, in which the respective elements behave, may communicate with each other, to thereby realize the present invention.

What is claimed is:

1. An information communication device comprising:
   a communication unit having an infrastructure communication function used for wireless LAN (local area network) communication with another device via a basic network and an ad-hoc communication function used for the wireless LAN direct communication with another device without using the basic network, the basic network including an electric system network and a communication system network independent of each other, the electric system network supplying electricity to an indoor electric device via a smart meter, the communication system network being established in parallel with the electric system network by at least one of wire communication or wireless communication with the smart meter;
   a monitoring unit to detect a failure in the basic network or a recovery of the basic network from the failure;
   a communication function switching unit to switch a communication function of the communication unit from the infrastructure communication function to the ad-hoc communication function upon a detection of the failure in the basic network by the monitoring unit, and to switch a communication function of the communication unit from the ad-hoc communication function to the infrastructure communication function upon a detection of the recovery from the failure;
   a storage unit to store a contact used to inform the failure in the basic network or the recovery of the basic network from the failure;
   a message generator unit to generate a notification message of the failure in the basic network upon the detection of the failure in the basic network, and to generate the notification message of the recovery of the basic network from the failure upon the detection of the recovery of the basic network from the failure;
   a control requesting unit to generate a control instruction for controlling a neighboring self-power-generating device to supply electricity to the smart meter and the information communication device itself in a case that communication with the neighboring self-power-generating device by communication using the ad-hoc communication function is enabled; and
   a transmitter to transmit the notification message generated by the message generator unit to the contact retrieved from the storage and to transmit the control instruction generated by the control requesting unit to the neighboring self-power-generating device, by a switched communication function.

2. The information communication device according to claim 1, further comprising
   a demand curve generator unit to generate a demand curve showing relation between meter data and measurement time, the meter data being included in meter information obtained from the smart meter as needed, and to provide the demand curve to the message generator unit.

3. The information communication device according to claim 1, further comprising:
   a priority storage unit to store priority of a device receiving electricity supplied from an electricity source being different from the basic network via the smart meter upon the failure in the basic network;
   a supply-demand balance regulating procedure generator unit to generate a procedure of regulating supply-demand balance of the device based on the priority of a device, the priority being stored in the priority storage unit; and
   a control requesting unit to transmit a control instruction to the smart meter for supplying electricity from the electricity source to devices based on a procedure generated by the supply-demand balance regulating procedure generator unit.

4. An information communication device comprising:
   a communication unit having an infrastructure communication function used for wireless LAN (local area network) communication with another device via a communication system network established in parallel with an electric system network to supply electricity and an ad-hoc communication function used for the wireless LAN communication with another device without using the communication system network;
   a switching unit to switch a communication function of the communication unit from the infrastructure communication function to the ad-hoc communication function upon a failure in the communication via the communication system network by the infrastructure communication function of the communication unit, and to switch the communication function of the communication unit from the ad-hoc communication function to the infrastructure communication function upon a recovery of the communication via the communication system network from the failure;
   a storage unit to store a contact used to inform the failure in the communication system network or the recovery of the communication system network from the failure;
   a peripheral information generator unit to generate information of a peripheral device obtained based on communication with a peripheral device by the ad-hoc communication function;
   a transmitter to transmit information on the peripheral device generated by the peripheral information generator unit to the contact retrieved from the storage by the switched communication function; and
   an electricity supplying unit to supply the electricity generated by a self-power-generating function upon a reception of an instruction instructing to supply electricity to a neighboring smart meter through communication by the ad-hoc communication function.

5. An information communication device comprising:
a communication unit having an infrastructure communication function used for wireless LAN (local area network) communication with another device via a second basic network and an ad-hoc communication function used for the wireless LAN communication with another device without using the second basic network, the second basic network being a communication system network established in parallel with a first basic network by at least one of wire communication or wireless communication with the smart meter, the first basic network being configured to supply electricity;
an acquisition unit to acquire meter information as to whether or not electricity is supplied from the first basic network from the smart meter;
a monitoring unit to detect a failure in the first basic network or a recovery of the first basic network from the failure, based on the meter information acquired by the acquisition unit;
a switching unit to switch a communication function of the communication unit from the infrastructure communication function to the ad-hoc communication function upon a detection of the failure in the first basic network by the monitoring unit, and to switch a communication function of the communication unit from the ad-hoc communication function to the infrastructure communication function upon a detection of the recovery of the first basic network by the monitoring unit;
a storage unit to store a contact used to inform the failure in the first basic network or the recovery of the first basic network from the failure;
a message generator unit to generate a notification message of a stop of the electricity supply from the first basic network or a restart of the electricity supply from the first basic network based on meter information obtained by the acquisition unit;
a transmitter to transmit the notification message generated by the message generator unit to the contact retrieved from the storage by a switched communication function; and
a control requesting unit to generate a control instruction for controlling a neighboring self-power-generating device to supply electricity to the smart meter and the information communication device itself in a case that communication with the neighboring self-power-generating device by communication using the ad-hoc communication function is enabled.

6. An information communication device comprising:
a communication unit having an infrastructure communication function used for wireless LAN communication with another device via a second basic network and an ad-hoc communication function used for the wireless LAN communication with another device without using the second basic network, the second basic network being a communication system network established in parallel with a first basic network by at least one of wire communication or wireless communication with a smart meter, the first basic network being an electric system network to supply electricity to an indoor electric device via the smart meter;
an acquisition unit to acquire communication information between the smart meter and the second basic network from the smart meter;
a monitoring unit to detect a failure in the second basic network or a recovery of the second basic network from the failure, based on the communication information acquired by the acquisition unit;
a switching unit to switch a communication function of the communication unit from the infrastructure communication function to the ad-hoc communication function upon a detection of the failure in the second basic network by the monitoring unit, and to switch a communication function of the communication unit from the ad-hoc communication function to the infrastructure communication function upon a detection of the recovery of the second basic network by the monitoring unit;
a storage unit to store a contact used to inform the failure in the second basic network or the recovery of the second basic network from the failure;
a message generator unit to generate a notification message of a failure in the second basic network or a recovery of the second basic network based on communication information obtained by the acquisition unit;
a transmitter to transmit the notification message generated by the message generator unit to the contact retrieved from the storage by a switched communication function; and
a control requesting unit to generate a control instruction for controlling a neighboring self-power-generating device to supply electricity to the smart meter and the information communication device itself in a case that communication with the neighboring self-power-generating device by communication using the ad-hoc communication function is enabled.

7. An information communication method performed by an information communication device comprising:
detecting a failure in a basic network or a recovery of the basic network from the failure, the basic network including an electric system network and a communication system network independent of each other, the electric system network supplying electricity to an indoor electric device via a smart meter, the communication system network being established in parallel with the electric system network by at least one of wire communication or wireless communication with the smart meter;
switching a communication function of the information communication device from an infrastructure communication function to an ad-hoc communication function upon a detection of the failure in the basic network, and switching a communication function from the ad-hoc communication function to the infrastructure communication function upon a detection of the recovery from the failure;
generating a notification message of the failure in the basic network upon the detection of the failure in the basic network, and generating notification message of the recovery of the basic network from the failure upon the detection of the recovery of the basic network from the failure;
transmitting the generated notification message to a preset contact by a switched communication function; and
generating a control instruction for controlling a neighboring self-power-generating device to supply electricity to the smart meter and the information communication device itself in a case that communication with the neighboring self-power-generating device by communication using the ad-hoc communication function is enabled.

* * * * *